United States Patent [19]
Frey

[11] Patent Number: 6,110,033
[45] Date of Patent: Aug. 29, 2000

[54] APPARATUS FOR THE FILLING OF MEAT SAUSAGE

[75] Inventor: Albert Frey, Herbrechtingen, Germany

[73] Assignee: Heinrich Frey Maschinenbau GmbH, Herbrechtingen-Bolheim, Germany

[21] Appl. No.: 09/138,479

[22] Filed: Aug. 21, 1998

[30] Foreign Application Priority Data

Aug. 29, 1997 [DE] Germany .............. 197 37 804

[51] Int. Cl.⁷ ........................... A22C 11/08
[52] U.S. Cl. ............................ 452/40; 452/41
[58] Field of Search ..................... 452/40, 41

[56] References Cited

U.S. PATENT DOCUMENTS

| | | |
|---|---|---|
| 2,805,444 | 9/1957 | Hensger . |
| 2,963,735 | 12/1960 | Gaudlitz ........................ 452/41 |
| 5,048,405 | 9/1991 | Takahashi . |
| 5,464,338 | 11/1995 | Powers . |
| 5,720,603 | 2/1998 | Miller et al. ..................... 452/41 |

FOREIGN PATENT DOCUMENTS

| | | |
|---|---|---|
| 0609513B1 | 8/1994 | European Pat. Off. . |
| 13386 | 4/1881 | Germany ........................ 452/41 |
| 4227621A1 | 2/1994 | Germany . |
| 7-24564 | 3/1995 | Japan . |

*Primary Examiner*—Willis Little
*Attorney, Agent, or Firm*—Townsend and Townsend and Crew LLP

[57] ABSTRACT

An apparatus is described for the filling of pasty products, comprising a conveyor apparatus which can be charged via a funnel and associated filling stations, with the conveying apparatus comprising at least two individual conveying mechanisms arranged in the same machine housing, which are fed via the funnel which is commonly associated with them and from each of which a filling tube or filling passage leads to a filling station directly adjacent the respective filling mechanism.

12 Claims, 1 Drawing Sheet

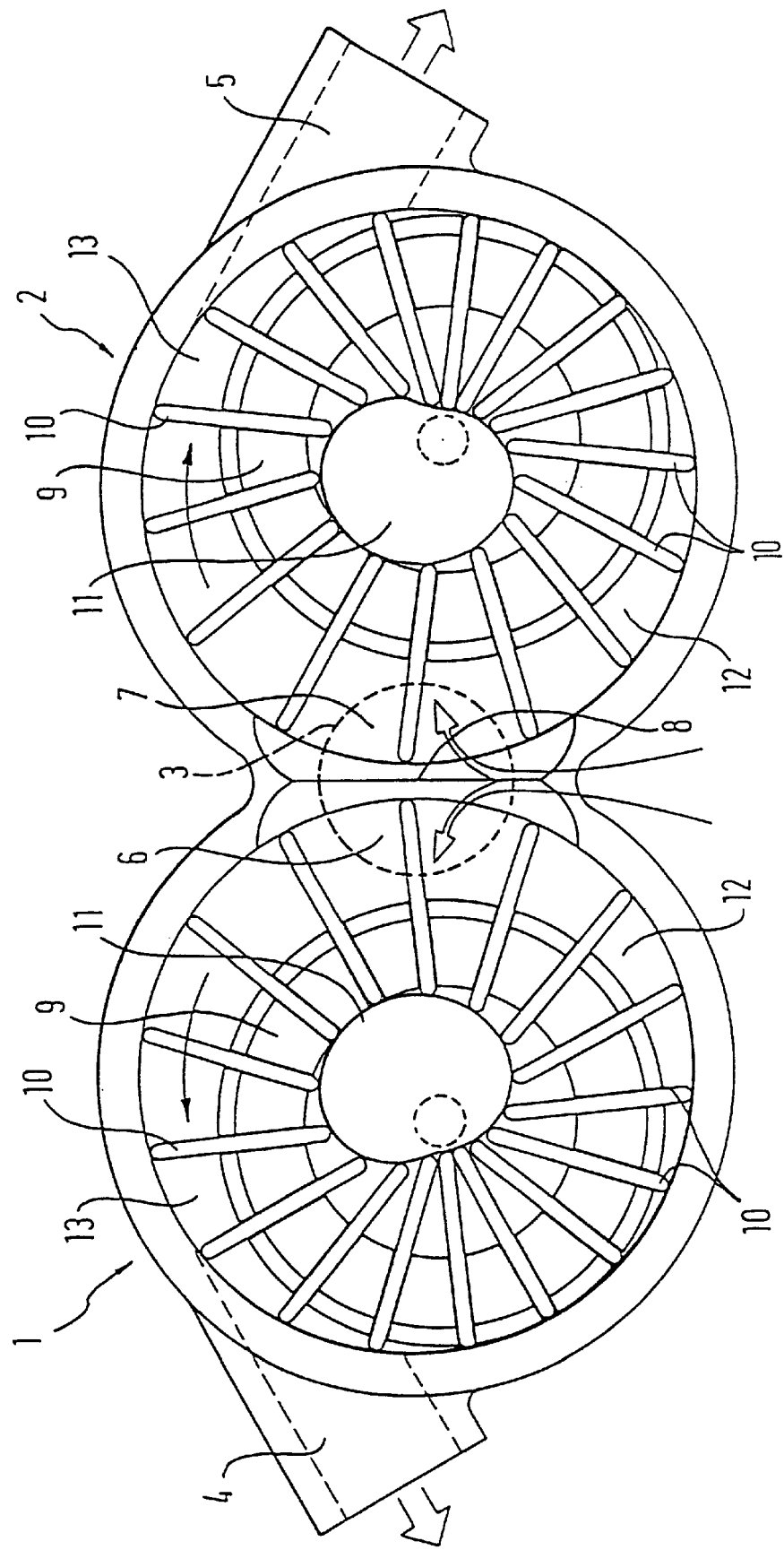

APPARATUS FOR THE FILLING OF MEAT SAUSAGE

The invention relates to an apparatus for the portioning or continuous filling of pasty products, in particular for the filling of sausage meat into natural or artificial skins, comprising a conveying apparatus which can be charged via a funnel and at least two filling stations connected to the conveying apparatus.

In order to increase the performance of apparatuses of the initially named kind, it is known to use a central filling unit dimensioned in accordance with the performance requirements with a corresponding forwarding apparatus, and with a plurality of tubes leading from the central filling unit to individual filling stations. An arrangement of this kind has, however, the very important disadvantage in practice that, as a result of the required duct length to the individual filling stations, the danger of smearing resulting from the wall friction is particularly large. For stiff meat this can have the consequence of the product being impaired in a very disturbing manner.

BRIEF SUMMARY OF THE INVENTION

The object of the invention is to provide an apparatus of the initially named kind which largely avoids the occurrence of smearing effects even with stiff meat and which is characterized by a compact and economical construction.

This object is satisfied in accordance with the invention essentially in that the conveying apparatus comprises at least two individual conveying mechanisms arranged in the same machine housing, which can be operated independently of one another and which are fed via the funnel which is jointly associated with them, and from each of which a filling tube or filling passage leads to a filling station directly adjacent the respective forwarding mechanism.

Through the use of a filling funnel which is common to the two conveying mechanisms, one achieves a very compact and favorable layout of the apparatus in addition to operating advantages, and through the use of one conveying mechanism for each filling passage leading to the respective filling station one can ensure a filling quality corresponding to the known apparatuses with only a single filling station. The disadvantages which are otherwise present with apparatuses with a plurality of filling stations can be avoided, in particular with regard to the danger of smearing and the necessary complicated cleaning procedures.

Although all kinds of customary conveying mechanisms, such as in particular screw pumps, external gearwheel pumps and the like, can be used as conveying mechanisms, two vane cell conveying mechanisms arranged with mirror symmetry are preferably provided as conveying mechanisms, with the filling chambers of the vane cell conveying mechanisms being arranged bordering on one another beneath the funnel outlet. Through corresponding filling of the funnel and by ensuring full volume charging, a uniform transport of the meat to the filling chambers can be ensured and this then has in turn the consequence that the two vane cell conveying mechanisms operate uniformly and correctly, as in the case of an individual operation of a vane cell conveying mechanism.

Further advantageous embodiments of the invention and will be explained in the following description of an embodiment with reference to the drawing.

BRIEF DESCRIPTION OF THE DRAWING

The single FIGURE of the drawing shows a schematic plan view onto a tandem or twin arrangement of vane cell conveying mechanisms in accordance with the invention which are fed via a common filling funnel.

DESCRIPTION OF THE PREFERRED EMBODIMENTS

The vane cell conveying mechanisms 1, 2 are conveying mechanisms which are particularly protective in their handling of meat and which satisfy the highest quality demands with respect to a perfect filled appearance on cutting all sausage types. The fat oxidation can be minimized by evacuation of the filling material, protein breakdown can be avoided and the content of germs can be reduced. This is the reason why such conveying apparatuses are preferably used in the context of the invention. The vane cell conveying mechanisms 1 are driven by customary drives, and in particular directly via servomotors, oil motors and the like, with it being possible to provide a common drive and a corresponding intermediate transmission for the two conveying mechanisms.

The two conveying mechanisms 1, 2 are arranged with mirror symmetry relative to one another, so that their filling chambers 6, 7, which are separated from one another in the embodiment by a wall 8, are disposed directly alongside one another. The filling funnel 3 common to the two conveying mechanisms 1, 2, which is only represented in the drawing by its outlet, is centrally arranged with respect to the conveying mechanisms 1, 2 and charges the two filling chambers 6, 7, simultaneously, as is symbolized by an arrow representation.

Each conveying mechanism 1, 2 includes in known manner a rotor 9, vanes 10 guided in the rotor and also a control cam track 11. The two oppositely rotating conveyor mechanisms 1, 2 accordingly have a vacuum zone 12 before the respective filling chambers 6, 7 and, following the filling chambers 6, 7, a pressure region 13, out of which the meat taken up in the filling chambers 6, 7 is conveyed via short filling passages 4, 5 to the associated filling station. The filling passages 4, 5 correspond in their shape and also in their length and their dimensions to the customary filling passages in machines with only a single filling station, which is equivalent to saying that their high product quality can also be ensured in the apparatus of the invention although this is an apparatus with a plurality of filling stations.

The filling chambers 6, 7 of the two vane cell conveying mechanisms need not necessarily be symmetrically disposed relative to one another, but rather they could also be mutually offset and in particular also adjustably offset relative to one another in order to promote uniform filling in dependence on specific products.

In accordance with further variants of the invention, the partition wall between the filling chambers can also extend in a predeterminable manner into the funnel outlet, i.e. into the lower region of the funnel space. However, this is not a necessity and it is indeed possible, in connection with the filling of correspondingly suitable products, to fully dispense with the partition wall between the two filling chambers.

What is claimed is:

1. Apparatus for filling a casing with a pasty product comprising a conveying apparatus which can be charged via a funnel, which has at least two filling stations connected to the conveying apparatus, and which comprises at least two individual conveying mechanisms arranged in a common machine housing and operable independently of one another, the funnel being jointly associated with the conveying mechanisms for feeding the pasty product to them, and a filling passage for each conveying mechanism leading directly to corresponding filling stations adjacent the respective conveying mechanism.

2. Apparatus in accordance with claim 1 wherein first and second mirror-symmetrically arranged vane cell conveying mechanisms are provided as the conveying mechanisms, the vane cell conveying mechanisms having filling chambers bordering on one another beneath the funnel outlet.

3. Apparatus in accordance with claim 2 including a wall separating the filling chambers of the first and second vane cell conveying mechanisms.

4. Apparatus in accordance with claim 2 including a common filling space for the first and second vane cell conveying mechanisms.

5. Apparatus in accordance with claim 1 wherein the first and second vane cell conveying mechanisms have filling chambers which are offset relative to one another in a circumferential direction of the vane cell conveying mechanisms.

6. Apparatus in accordance with claim 5 wherein the offset of the filling chambers is adjustable.

7. Apparatus in accordance with claim 1 wherein the first and second vane cell conveying mechanisms have filling chambers, wherein the funnel has an outlet, and including a partition wall between the filling chambers extending into the funnel outlet.

8. Apparatus in accordance with claim 1 including means for synchronously driving the at least two conveying mechanisms.

9. Apparatus in accordance with claim 1 wherein the at least two conveying mechanisms are separately driven.

10. Apparatus for filling a casing with a pasty product comprising a housing, an intake funnel for feeding fresh product into the housing, and first and second, independent outlets for flowing the product into the casing; and first and second conveying mechanisms associated with the first and second outlets, respectively, each conveying mechanism receiving pasty product from the funnel and discharging it into the associated outlet.

11. Apparatus for filling casings with a pasty product comprising a housing; first and second individual conveying mechanisms disposed inside the housing; a funnel defining an intake opening for the pasty product and disposed upstream of the conveying mechanisms for directing the pasty product to the conveying mechanisms; and a separate pasty product discharge passage associated with each conveying mechanism for simultaneously and continuously flowing the pasty product from the conveying mechanisms via the associated passages into the casings.

12. Apparatus for filling a casing with a pasty product comprising a housing; first and second mirror-symmetrically arranged vane cell conveying mechanisms disposed inside the housing and rotatable about spaced-apart, parallel, first and second axes of rotation; a funnel having an outlet for feeding the pasty product to the conveying mechanisms in a direction substantially parallel to the first and second axes of rotation; and a product discharge for and operatively coupled with each conveying mechanism for simultaneously filling first and second casings with the pasty product.

* * * * *